(12) United States Patent
Marcu et al.

(10) Patent No.: US 8,943,080 B2
(45) Date of Patent: Jan. 27, 2015

(54) SYSTEMS AND METHODS FOR IDENTIFYING PARALLEL DOCUMENTS AND SENTENCE FRAGMENTS IN MULTILINGUAL DOCUMENT COLLECTIONS

(75) Inventors: Daniel Marcu, Hermosa Beach, CA (US); Dragos Stefan Munteanu, Culver City, CA (US)

(73) Assignee: University of Southern California, Los Angeles, CA (US)

( * ) Notice: Subject to any disclaimer, the term of this patent is extended or adjusted under 35 U.S.C. 154(b) by 1286 days.

(21) Appl. No.: 11/635,248

(22) Filed: Dec. 5, 2006

(65) Prior Publication Data
US 2007/0250306 A1    Oct. 25, 2007

Related U.S. Application Data

(60) Provisional application No. 60/790,131, filed on Apr. 7, 2006.

(51) Int. Cl.
*G06F 17/30* (2006.01)
*G06F 17/28* (2006.01)

(52) U.S. Cl.
CPC .................................. *G06F 17/2827* (2013.01)
USPC ......................................................... 707/758

(58) Field of Classification Search
CPC .......... G06F 17/30401; G06F 17/2827; G06F 17/2845; G06F 17/2854; G06F 17/2836; G06F 17/289
USPC ................... 707/761, 708, 728, 748, 749, 758
See application file for complete search history.

(56) References Cited

U.S. PATENT DOCUMENTS 4,502,128 A    2/1985  Okajima et al.
4,599,691 A    7/1986  Sakaki et al.
(Continued)

FOREIGN PATENT DOCUMENTS

DE    202005022113.9    2/2014
EP         0469884       2/1992
(Continued)

OTHER PUBLICATIONS http://web.archive.org/web/20040222202831/http://en.wikipedia.org/wiki/Document, Feb, 24, 2004.*
(Continued)

*Primary Examiner* — Ajay Bhatia
*Assistant Examiner* — Fatima Mina
(74) *Attorney, Agent, or Firm* — Carr & Ferrell LLP

(57) ABSTRACT

Systems, computer programs, and methods for identifying parallel documents and/or fragments in a bilingual collection are provided. The method for identifying parallel sub-sentential fragments in a bilingual collection comprises translating a source document from a bilingual collection. The method further includes querying a target library associated with the bilingual collection using the translated source document, and identifying one or more target documents based on the query. Subsequently, a source sentence associated with the source document is aligned to one or more target sentences associated with the one or more target documents. Finally, the method includes determining whether a source fragment associated with the source sentence comprises a parallel translation of a target fragment associated with the one or more target sentences.

19 Claims, 8 Drawing Sheets

(56) References Cited

U.S. PATENT DOCUMENTS

| | | |
|---|---|---|
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,488,725 A * | 1/1996 | Turtle et al. ............... 1/1 |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,850,561 A * | 12/1998 | Church et al. ............... 715/234 |
| 5,855,015 A | 12/1998 | Shoham |
| 5,864,788 A | 1/1999 | Kutsumi |
| 5,867,811 A * | 2/1999 | O'Donoghue ............... 704/1 |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji |
| 5,909,681 A | 6/1999 | Passera et al. |
| 5,930,746 A | 7/1999 | Ting |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 * | 3/2002 | Poznanski et al. ............... 704/8 |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,473,896 B1 | 10/2002 | Hicken et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,952,665 B1 | 10/2005 | Shimomura et al. |
| 6,983,239 B1 | 1/2006 | Epstein |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 * | 5/2006 | Menzes et al. ............... 704/2 |
| 7,054,803 B2 * | 5/2006 | Eisele ............... 704/2 |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |

(56) References Cited

U.S. PATENT DOCUMENTS

| | | | |
|---|---|---|---|
| 7,107,215 | B2 | 9/2006 | Ghali |
| 7,113,903 | B1 | 9/2006 | Riccardi et al. |
| 7,143,036 | B2 | 11/2006 | Weise |
| 7,146,358 | B1 * | 12/2006 | Gravano et al. ............... 1/1 |
| 7,149,688 | B2 | 12/2006 | Schalkwyk |
| 7,171,348 | B2 | 1/2007 | Scanlan |
| 7,174,289 | B2 | 2/2007 | Sukehiro |
| 7,177,792 | B2 | 2/2007 | Knight et al. |
| 7,191,115 | B2 | 3/2007 | Moore |
| 7,194,403 | B2 | 3/2007 | Okura et al. |
| 7,197,451 | B1 | 3/2007 | Carter et al. |
| 7,206,736 | B2 | 4/2007 | Moore |
| 7,209,875 | B2 | 4/2007 | Quirk et al. |
| 7,219,051 | B2 | 5/2007 | Moore |
| 7,239,998 | B2 | 7/2007 | Xun |
| 7,249,012 | B2 | 7/2007 | Moore |
| 7,249,013 | B2 | 7/2007 | Al-Onaizan et al. |
| 7,283,950 | B2 | 10/2007 | Pournasseh et al. |
| 7,295,962 | B2 | 11/2007 | Marcu |
| 7,302,392 | B1 | 11/2007 | Thenthiruperai et al. |
| 7,319,949 | B2 | 1/2008 | Pinkham |
| 7,340,388 | B2 | 3/2008 | Soricut et al. |
| 7,346,487 | B2 | 3/2008 | Li |
| 7,346,493 | B2 | 3/2008 | Ringger et al. |
| 7,349,839 | B2 | 3/2008 | Moore |
| 7,349,845 | B2 | 3/2008 | Coffman et al. |
| 7,356,457 | B2 | 4/2008 | Pinkham et al. |
| 7,369,998 | B2 | 5/2008 | Sarich et al. |
| 7,373,291 | B2 | 5/2008 | Garst |
| 7,383,542 | B2 | 6/2008 | Richardson et al. |
| 7,389,222 | B1 | 6/2008 | Langmead et al. |
| 7,389,234 | B2 | 6/2008 | Schmid et al. |
| 7,403,890 | B2 | 7/2008 | Roushar |
| 7,409,332 | B2 | 8/2008 | Moore |
| 7,409,333 | B2 | 8/2008 | Wilkinson et al. |
| 7,447,623 | B2 | 11/2008 | Appleby |
| 7,454,326 | B2 | 11/2008 | Marcu et al. |
| 7,496,497 | B2 | 2/2009 | Liu |
| 7,533,013 | B2 | 5/2009 | Marcu |
| 7,536,295 | B2 | 5/2009 | Cancedda et al. |
| 7,546,235 | B2 | 6/2009 | Brockett et al. |
| 7,552,053 | B2 | 6/2009 | Gao et al. |
| 7,565,281 | B2 | 7/2009 | Appleby |
| 7,574,347 | B2 | 8/2009 | Wang |
| 7,580,830 | B2 | 8/2009 | Al-Onaizan et al. |
| 7,587,307 | B2 | 9/2009 | Cancedda et al. |
| 7,620,538 | B2 | 11/2009 | Marcu et al. |
| 7,620,632 | B2 | 11/2009 | Andrews |
| 7,624,005 | B2 | 11/2009 | Koehn et al. |
| 7,624,020 | B2 | 11/2009 | Yamada et al. |
| 7,627,479 | B2 | 12/2009 | Travieso et al. |
| 7,680,646 | B2 | 3/2010 | Lux-Pogodalla et al. |
| 7,689,405 | B2 | 3/2010 | Marcu |
| 7,698,124 | B2 | 4/2010 | Menezes et al. |
| 7,698,125 | B2 | 4/2010 | Graehl et al. |
| 7,707,025 | B2 | 4/2010 | Whitelock |
| 7,711,545 | B2 | 5/2010 | Koehn |
| 7,716,037 | B2 | 5/2010 | Precoda |
| 7,801,720 | B2 | 9/2010 | Satake et al. |
| 7,813,918 | B2 * | 10/2010 | Muslea et al. ............... 704/9 |
| 7,822,596 | B2 | 10/2010 | Elgazzar et al. |
| 7,925,494 | B2 | 4/2011 | Cheng et al. |
| 7,957,953 | B2 | 6/2011 | Moore |
| 7,974,833 | B2 | 7/2011 | Soricut et al. |
| 8,060,360 | B2 | 11/2011 | He |
| 8,145,472 | B2 | 3/2012 | Shore et al. |
| 8,214,196 | B2 | 7/2012 | Yamada et al. |
| 8,244,519 | B2 | 8/2012 | Bicici et al. |
| 8,265,923 | B2 | 9/2012 | Chatterjee et al. |
| 8,296,127 | B2 * | 10/2012 | Marcu et al. ............... 704/5 |
| 8,615,389 | B1 | 12/2013 | Marcu |
| 8,666,725 | B2 | 3/2014 | Och |
| 2001/0009009 | A1 | 7/2001 | Iizuka |
| 2001/0029455 | A1 | 10/2001 | Chin et al. |
| 2002/0002451 | A1 | 1/2002 | Sukehiro |
| 2002/0013693 | A1 | 1/2002 | Fuji |
| 2002/0040292 | A1 * | 4/2002 | Marcu ............... 704/4 |
| 2002/0046018 | A1 | 4/2002 | Marcu et al. |
| 2002/0046262 | A1 | 4/2002 | Heilig et al. |
| 2002/0059566 | A1 | 5/2002 | Delcambre et al. |
| 2002/0078091 | A1 | 6/2002 | Vu et al. |
| 2002/0087313 | A1 | 7/2002 | Lee et al. |
| 2002/0099744 | A1 | 7/2002 | Coden et al. |
| 2002/0107683 | A1 * | 8/2002 | Eisele ............... 704/2 |
| 2002/0111788 | A1 | 8/2002 | Kimpara |
| 2002/0111789 | A1 | 8/2002 | Hull |
| 2002/0111967 | A1 | 8/2002 | Nagase |
| 2002/0143537 | A1 | 10/2002 | Ozawa et al. |
| 2002/0152063 | A1 | 10/2002 | Tokieda et al. |
| 2002/0169592 | A1 | 11/2002 | Aityan |
| 2002/0188438 | A1 | 12/2002 | Knight et al. |
| 2002/0198699 | A1 | 12/2002 | Greene et al. |
| 2002/0198701 | A1 | 12/2002 | Moore |
| 2003/0009322 | A1 | 1/2003 | Marcu |
| 2003/0023423 | A1 | 1/2003 | Yamada et al. |
| 2003/0144832 | A1 | 7/2003 | Harris |
| 2003/0154071 | A1 | 8/2003 | Shreve |
| 2003/0158723 | A1 | 8/2003 | Masuichi et al. |
| 2003/0176995 | A1 | 9/2003 | Sukehiro |
| 2003/0182102 | A1 | 9/2003 | Corston-Oliver et al. |
| 2003/0191626 | A1 | 10/2003 | Al-Onaizan et al. |
| 2003/0204400 | A1 | 10/2003 | Marcu et al. |
| 2003/0216905 | A1 | 11/2003 | Chelba et al. |
| 2003/0217052 | A1 | 11/2003 | Rubenczyk et al. |
| 2003/0233222 | A1 | 12/2003 | Soricut et al. |
| 2004/0006560 | A1 | 1/2004 | Chan et al. |
| 2004/0015342 | A1 | 1/2004 | Garst |
| 2004/0024581 | A1 | 2/2004 | Koehn et al. |
| 2004/0030551 | A1 | 2/2004 | Marcu et al. |
| 2004/0035055 | A1 | 2/2004 | Zhu et al. |
| 2004/0044530 | A1 | 3/2004 | Moore |
| 2004/0068411 | A1 | 4/2004 | Scanlan |
| 2004/0098247 | A1 | 5/2004 | Moore |
| 2004/0102956 | A1 | 5/2004 | Levin |
| 2004/0102957 | A1 | 5/2004 | Levin |
| 2004/0111253 | A1 | 6/2004 | Luo et al. |
| 2004/0115597 | A1 | 6/2004 | Butt |
| 2004/0122656 | A1 | 6/2004 | Abir |
| 2004/0167768 | A1 | 8/2004 | Travieso et al. |
| 2004/0167784 | A1 | 8/2004 | Travieso et al. |
| 2004/0193401 | A1 | 9/2004 | Ringger et al. |
| 2004/0230418 | A1 * | 11/2004 | Kitamura ............... 704/8 |
| 2004/0260532 | A1 | 12/2004 | Richardson et al. |
| 2005/0021322 | A1 | 1/2005 | Richardson et al. |
| 2005/0021517 | A1 | 1/2005 | Marchisio |
| 2005/0033565 | A1 | 2/2005 | Koehn |
| 2005/0038643 | A1 | 2/2005 | Koehn |
| 2005/0055199 | A1 | 3/2005 | Ryzchachkin et al. |
| 2005/0055217 | A1 | 3/2005 | Sumita et al. |
| 2005/0060160 | A1 | 3/2005 | Roh et al. |
| 2005/0075858 | A1 | 4/2005 | Pournasseh et al. |
| 2005/0086226 | A1 | 4/2005 | Krachman |
| 2005/0102130 | A1 | 5/2005 | Quirk et al. |
| 2005/0125218 | A1 | 6/2005 | Rajput et al. |
| 2005/0149315 | A1 | 7/2005 | Flanagan et al. |
| 2005/0171757 | A1 | 8/2005 | Appleby |
| 2005/0204002 | A1 | 9/2005 | Friend |
| 2005/0228640 | A1 | 10/2005 | Aue et al. |
| 2005/0228642 | A1 | 10/2005 | Mau et al. |
| 2005/0228643 | A1 * | 10/2005 | Munteanu et al. ............... 704/9 |
| 2005/0267738 | A1 | 12/2005 | Wilkinson et al. |
| 2006/0004563 | A1 | 1/2006 | Campbell et al. |
| 2006/0015320 | A1 | 1/2006 | Och |
| 2006/0015323 | A1 | 1/2006 | Udupa et al. |
| 2006/0020448 | A1 | 1/2006 | Chelba et al. |
| 2006/0041428 | A1 | 2/2006 | Fritsch et al. |
| 2006/0095248 | A1 | 5/2006 | Menezes et al. |
| 2006/0111891 | A1 | 5/2006 | Menezes et al. |
| 2006/0111892 | A1 | 5/2006 | Menezes et al. |
| 2006/0111896 | A1 | 5/2006 | Menezes et al. |
| 2006/0129424 | A1 | 6/2006 | Chan |
| 2006/0142995 | A1 | 6/2006 | Knight et al. |
| 2006/0150069 | A1 * | 7/2006 | Chang ............... 715/500.1 |
| 2006/0167984 | A1 | 7/2006 | Fellenstein et al. |

(56) References Cited

U.S. PATENT DOCUMENTS

| | | | |
|---|---|---|---|
| 2006/0190241 A1 | 8/2006 | Goutte et al. | |
| 2007/0016400 A1 | 1/2007 | Soricutt et al. | |
| 2007/0016401 A1 | 1/2007 | Ehsani et al. | |
| 2007/0033001 A1 | 2/2007 | Muslea et al. | |
| 2007/0050182 A1 | 3/2007 | Sneddon et al. | |
| 2007/0078654 A1 | 4/2007 | Moore | |
| 2007/0078845 A1 | 4/2007 | Scott et al. | |
| 2007/0083357 A1 | 4/2007 | Moore et al. | |
| 2007/0094169 A1 | 4/2007 | Yamada et al. | |
| 2007/0112553 A1* | 5/2007 | Jacobson | 704/2 |
| 2007/0112555 A1 | 5/2007 | Lavi et al. | |
| 2007/0112556 A1 | 5/2007 | Lavi et al. | |
| 2007/0122792 A1 | 5/2007 | Galley et al. | |
| 2007/0168202 A1 | 7/2007 | Changela et al. | |
| 2007/0168450 A1 | 7/2007 | Prajapat et al. | |
| 2007/0180373 A1 | 8/2007 | Bauman et al. | |
| 2007/0219774 A1 | 9/2007 | Quirk et al. | |
| 2007/0265825 A1 | 11/2007 | Cancedda et al. | |
| 2007/0265826 A1 | 11/2007 | Chen et al. | |
| 2007/0269775 A1 | 11/2007 | Andreev et al. | |
| 2007/0294076 A1 | 12/2007 | Shore et al. | |
| 2008/0052061 A1 | 2/2008 | Kim et al. | |
| 2008/0065478 A1 | 3/2008 | Kohlmeier et al. | |
| 2008/0114583 A1 | 5/2008 | Al-Onaizan et al. | |
| 2008/0154581 A1 | 6/2008 | Lavi et al. | |
| 2008/0183555 A1 | 7/2008 | Walk | |
| 2008/0215418 A1 | 9/2008 | Kolve et al. | |
| 2008/0249760 A1 | 10/2008 | Marcu et al. | |
| 2008/0270109 A1 | 10/2008 | Och | |
| 2008/0270112 A1 | 10/2008 | Shimohata | |
| 2008/0281578 A1 | 11/2008 | Kumaran et al. | |
| 2008/0307481 A1 | 12/2008 | Panje | |
| 2009/0076792 A1 | 3/2009 | Lawson-Tancred | |
| 2009/0083023 A1 | 3/2009 | Foster et al. | |
| 2009/0119091 A1 | 5/2009 | Sarig | |
| 2009/0125497 A1 | 5/2009 | Jiang et al. | |
| 2009/0234634 A1 | 9/2009 | Chen et al. | |
| 2009/0241115 A1 | 9/2009 | Raffo et al. | |
| 2009/0326912 A1 | 12/2009 | Ueffing | |
| 2010/0017293 A1 | 1/2010 | Lung et al. | |
| 2010/0042398 A1 | 2/2010 | Marcu et al. | |
| 2010/0138213 A1 | 6/2010 | Bicici et al. | |
| 2010/0174524 A1 | 7/2010 | Koehn | |
| 2011/0029300 A1 | 2/2011 | Marcu et al. | |
| 2011/0066643 A1 | 3/2011 | Cooper et al. | |
| 2011/0082684 A1 | 4/2011 | Soricut et al. | |
| 2012/0323554 A1 | 12/2012 | Hopkins et al. | |

FOREIGN PATENT DOCUMENTS

| | | | |
|---|---|---|---|
| EP | 0715265 | 6/1996 | |
| EP | 0933712 | 8/1999 | |
| EP | 0933712 A3 | 1/2001 | |
| JP | 07244666 | 1/1995 | |
| JP | 10011447 | 1/1998 | |
| JP | 11272672 | 10/1999 | |
| JP | 2004501429 | 1/2004 | |
| JP | 2004062726 | 2/2004 | |
| JP | 2008101837 | 5/2008 | |
| JP | 5452868 | 1/2014 | |
| WO | WO03083709 | 10/2003 | |
| WO | WO 2004042615 A1 * | 5/2004 | G06F 17/30 |

OTHER PUBLICATIONS http://wayback.archive.org/web/20050101000000*/http:////dictionary.reference.com//browse//identifying, Feb 28, 2005.*

Abney, Stephen, "Parsing by Chunks," 1991, Principle-Based Parsing: Computation and Psycholinguistics, vol. 44, pp. 257-279.

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract", 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL, pp. 400-408.

Al-Onaizan et al., "Translating with Scarce Resources," 2000, 17th National Conference of the American Association for Artificial Intelligence, Austin, TX, pp. 672-678.

Alshawi et al., "Learning Dependency Translation Models as Collections of Finite-State Head Transducers," 2000, Computational Linguistics, vol. 26, pp. 45-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bangalore, S. and Rambow, 0., "Evaluation Metrics for Generation," 2000, Proc. of the 1st International Natural Language Generation Conf., vol. 14, pp. 1-8.

Bangalore, S. and Rambow, 0., "Using TAGs, a Tree Model, and a Language Model for Generation," May 2000, Workshop TAG+5, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle.

Brill, Eric. "Transformation-Based Error-Driven Learning and Natural Language Processing: A Case Study in Part of Speech Tagging"; 1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.

Brown et al., "The Mathematics of Statistical Machine Translation: Parameter D Estimation," 1993, Computational Linguistics, vol. 19, Issue 2, pp. 263-311.

Brown et al., "Word-Sense Disambiguation Using Statistical Methods," 1991, Proc. of 29th Annual ACL, pp. 264-270.

Carl, Michael. "A Constructivist Approach to Machine Translation," 1998, New Methods of Language Processing and Computational Natural Language Learning, pp. 247-256.

Chen, K. and Chen, H., "Machine Translation: An Integrated Approach," 1995, Proc. of 6th In'tl Cont. on Theoretical and Methodological Issue in MT, pp. 287-294.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Corston-Oliver, Simon, "Beyond String Matching and Cue Phrases: Improving Efficiency and Coverage in Discourse Analysis", 1998, The MAI Spring Symposium on Intelligent Text Summarization, pp. 9-15.

Dagan, I. and Itai, A., "Word Sense Disambiguation Using a Second Language Monolingual Corpus", 1994, Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc.of the Conference on Content Based Multimedia Information Access (RIAO).

(56) References Cited

OTHER PUBLICATIONS

Elhadad, M. and Robin, J., "An Overview of Surge: a Reusable Comprehensive Syntactic Realization Component," 1996, Technical Report 96-03, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad et al., "Floating Constraints in Lexical Choice", 1996, ACL, 23(2): 195-239.

Elhadad, Michael, "FUF: the Universal Unifier User Manual Version 5.2", 1993, Department of Computer Science, Ben Gurion University, Beer Sheva, Israel.

Elhadad. M., and Robin, J., "Surge: a Comprehensive Plug-in Syntactic Realization Component for Text Generation", 1999 (available at http://www.cs.bgu.ac.il/-elhadad/pub.html).

Elhadad, Michael, "Using Argumentation to Control Lexical Choice: A Functional Unification Implementation", 1992, Ph.D. Thesis, Graduate School of Arts and Sciences, Columbia University.

Fung, Pascale, "Compiling Bilingual Lexicon Entries From a Non-Parallel English-Chinese Corpus", 1995, Proc, of the Third Workshop on Very Large Corpora, Boston, MA, pp. 173-183.

Fung, P. and Vee, L., "An IR Approach for Translating New Words from Nonparallel, Comparable Texts", 1998, 36th Annual Meeting of the ACL, 17th International Conference on Computational Linguistics, pp. 414-420.

Gale, W. and Church, K., "A Program for Aligning Sentences in Bilingual Corpora," 1991, 29th Annual Meeting of the ACL, pp. 177-183.

Germann, Ulrich: "Building a Statistical Machine Translation System from Scratch: How Much Bang for the Buck Can We Expect?" Proc. of the Data-Driven MT Workshop of ACL-01, Toulouse, France, 2001.

Germann et al., "Fast Decoding and Optimal Decoding for Machine Translation", 2001, Proc. of the 39th Annual Meeting of the ACL, Toulouse, France, pp. 228-235.

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Grefenstette, Gregory, "The World Wide Web as a Resource for Example-Based Machine Translation Tasks", 1999, Translating and the Computer 21, Proc. of the 21 st International Cant. on Translating and the Computer. London, UK, 12 pp.

Hatzivassiloglou, V. et al., "Unification-Based Glossing",. 1995, Proc. of the International Joint Conference on Artificial Intelligence, pp. 1382-1389.

Ide, N. and Veronis, J., "Introduction to the Special Issue on Word Sense Disambiguation: The State of the Art", Mar. 1998, Computational Linguistics, vol. 24, Issue 1, pp. 2-40.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Knight, K. and Yamada, K., "A Computational Approach to Deciphering Unknown Scripts," 1999, Proc. of the ACL Workshop on Unsupervised Learning in Natural Language Processing.

Knight, K. and Al-Onaizan, Y., "A Primer on Finite-State Software for Natural Language Processing", 1999 (available at http://www.isLedullicensed-sw/carmel).

Knight, Kevin, "A Statistical MT Tutorial Workbook," 1999, JHU Summer Workshop (available at http://www.isLedu/natural-language/mUwkbk.rtf).

Knight, Kevin, "Automating Knowledge Acquisition for Machine Translation," 1997, AI Magazine 18(4).

Rich, E. and Knight, K., "Artificial Intelligence, Second Edition," 1991, McGraw-Hili Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Walde, S., "Robust German Noun Chunking With a Probabilistic Context-Free Grammar," 2000, Proc. of the 18th Conference on Computational Linguistics, vol. 2, pp. 726-732.

Selman et al., "A New Method for Solving Hard Satisfiability Problems," 1992, Proc. of the 10th National Conference on Artificial Intelligence, San Jose, CA, pp. 440-446.

Schutze, Hinrich, "Automatic Word Sense Discrimination," 1998, Computational Linguistics, Special Issue on Word Sense Disambiguation, vol. 24, Issue 1, pp. 97-123.

Sobashima et al., "A Bidirectional Transfer-Driven Machine Translation System for Spoken Dialogues," 1994, Proc. of 15th Conference on Computational Linguistics, vol. 1, pp. 64-68.

Shapiro, Stuart (ed.), "Encyclopedia of Artificial Intelligence, 2nd edition", vol. D 2,1992, John Wiley & Sons Inc; "Unification" article, K. Knight, pp. 1630-1637.

Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workkshop on Computational Approaches to Semitic Language.

Sun et al., "Chinese Named Entity Identification Using Class-based Language Model," 2002, Proc. of 19th International Conference on Computational Linguistics, Taipei, Taiwan, vol. 1, pp. 1-7.

Sumita et al., "A Discourse Structure Analyzer for Japanese Text," 1992, Proc. of the International Conference on Fifth Generation Computer Systems, vol. 2, pp. 1133-1140.

Taylor et al., "The Penn Treebank: An Overview," in A. Abeill (ed.), D Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Emperical Methods in Natural Language Processing and Very Large Corpora.

Tillmann et al., "A DP based Search Using Monotone Alignments in Statistical Translation," 1997, Proc. of the Annual Meeting of the ACL, pp. 366-372.

Tillman, C. and Xia, F., "A Phrase-Based Unigram Model for Statistical Machine Translation," 2003, Proc. of the North American Chapter of the ACL on Human Language Technology, vol. 2, pp. 106-108.

Veale, T. and Way, A., "Gaijin: A Bootstrapping, Template-Driven Approach to Example-Based MT," 1997, Proc. of New Methods in Natural Language Processing (NEMLP97), Sofia, Bulgaria.

Vogel, S. and Ney, H., "Construction of a Hierarchical Translation Memory," 2000, Proc. of Cooling 2000, Saarbrucken, Germany, pp. 1131-1135.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Wang, Ye-Yi, "Grammar Interference and Statistical Machine Translation," 1998, Ph.D Thesis, Carnegie Mellon University, Pittsburgh, PA.

Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summa-

(56) References Cited

OTHER PUBLICATIONS ries," 1999, Proc. of SIGIR '99, 22nd International Conference on Research and Development in Information Retrieval, Berkeley, CA, pp. 315-316.

Wang, Y. and Waibel, A., "Decoding Algorithm in Statistical Machine Translation," 1996, Proc. of the 35th Annual Meeting of the ACL, pp. 366-372.

Wu, Dekai, "Stochastic Inversion Transduction Grammars and Bilingual Parsing of Parallel Corpora," 1997, Computational Linguistics, vol. 23, Issue 3, pp. 377-403.

Wu, Dekai, "A Polynomial-Time Algorithm for Statistical Machine Translation," 1996, Proc. of 34th Annual Meeting of the ACL, pp. 152-158.

Yamada, K. and Knight, K., "A Decoder for Syntax-based Statistical MT," 2001, Proceedings of the 40th Annual Meeting of the ACL, pp. 303-310.

Yamada, K. and Knight, K. "A Syntax-based Statistical Translation Model," D 2001, Proc. of the 39th Annual Meeting of the ACL, pp. 523-530.

Yamamoto et al., "A Comparative Study on Translation Units for Bilingual Lexicon Extraction," 2001, Japan Academic Association for Copyright Clearance, Tokyo, Japan.

Yarowsky, David, "Unsupervised Word Sense Disambiguation Rivaling Supervised Methods," 1995, 33rd Annual Meeting of the ACL, pp. 189-196.

Callan et al., "TREC and TIPSTER Experiments with Inquery," 1994, Information Processing and Management, vol. 31, Issue 3, pp. 327-343.

Cohen, Yossi, "Interpreter for FUF," (available at ftp:/lftp.cs.bgu.ac.il/ pUb/people/elhadad/fuf-life.lf).

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue 3, pp. 349-380.

Russell, S. and Norvig, P., "Artificial Intelligence: A Modern Approach," 1995, Prentice-Hall, Inc., New Jersey [redacted—table of contents].

Ueffing et al., "Generation of Word Graphs in Statistical Machine Translation," 2002, Proc. of Empirical Methods in Natural Language Processing (EMNLP), pp. 156-163.

Kumar, R. and L1, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.

Yamada-K., "A Syntax-Basaed Statistical Translation Model," 2002 PhD Disseration, pp. 1-141.

Al-Onaizan et al., "Translation with Scarce Resources," 2000 Univ. of Southern Calif., pp. 1-7.

Imamura et al., "Feedback Cleaning of Machine Translation Rules Using Automatic Evaluation," 2003 Computational Linguistics, pp. 447-454.

Lee-Y.S.,"Neural Network Approach to Adaptive Learning: with an Application to Chinese Homophone Disambiguation," IEEE pp. 1521-1526.

Rayner et al.,"Hybrid Language Processing in the Spoken Language Translator," IEEE, pp. 107-110.

Rogati et al., "Resource Selection for Domain-Specific Cross-Lingual IR," ACM 2004, pp. 154-161.

Patent Cooperation Treaty International Preliminary Report on Patentability and The Written Opinion, International application No. PCT/US2008/004296, Oct. 6, 2009, 5 pgs.

Knight, K. and Chander, I., "Automated Postediting of Documents,"1994, Proc. of the 12th Conference on Artificial Intelligence, pp. 779-784.

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System", 1995, Proc. of the14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1, No. 4.

Knight et al., "Integrating Knowledge Bases and Statistics in MT," 1994, Proc. of the Conference of the Association for Machine Translation in the Americas.

Knight, Kevin, "Learning Word Meanings by Instruction,"1996, Proc. of the D National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight, K. et al., "Translation with Finite-State Devices," 1998, Proc. of the 3rd AMTA Conference, pp. 421-437.

Knight, K. and Hatzivassiloglou, V., "Two-Level, Many-Paths Generation," D 1995, Proc. of the 33rd Annual Conference of the ACL, pp. 252-260.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary, Irene, "An Empirical Verification of Coverage and Correctness for a General-Purpose Sentence Generator," 1998, Proc. 2nd Int'l Natural Language Generation Conference.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-171.

Langkilde, I. and Knight, K., "The Practical Value of N-Grams in Generation," 1998, Proc. of the 9th International Natural Language Generation Workshop, pp. 248-255.

Langkilde, I. and Knight, K., "Generation that Exploits Corpus-Based Statistical Knowledge," 1998, Proc. of the COLING-ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

(56) References Cited

OTHER PUBLICATIONS

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.
Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.
Marcu, Daniel, "Discourse trees are good indicators of importance in text," 1999, Advances in Automatic Text Summarization, The MIT Press, Cambridge, MA.
Marcu, Daniel, "Instructions for Manually Annotating the Discourse Structures of Texts," 1999, Discourse Annotation, pp. 1-49.
Marcu, Daniel, "The Rhetorical Parsing of Natural Language Texts," 1997, Proceedings of ACLIEACL '97, pp. 96-103.
Marcu, Daniel, "The Rhetorical Parsing, Summarization, and Generation of Natural Language Texts," 1997, Ph.D. Thesis, Graduate Department of Computer Science, University of Toronto.
Marcu, Daniel, "Towards a Unified Approach to Memory- and Statistical-Based Machine Translation," 2001, Proc. of the 39th Annual Meeting of the ACL, pp. 378-385.
Melamed, I. Dan, "A Word-to-Word Model of Translational Equivalence," 1997, Proc. of the 35th Annual Meeting of the ACL, Madrid, Spain, pp. 490-497.
Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.
Melamed, I. Dan, "Empirical Methods for Exploiting Parallel Texts," 2001, MIT Press, Cambridge, MA [table of contents].
Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.
Milke et al., "A full-text retrieval system with a dynamic abstract generation function," 1994, Proceedings of SI-GIR '94, pp. 152-161.
Mikheev et al., "Named Entity Recognition without Gazeteers," 1999, Proc. of European Chapter of the ACL, Bergen, Norway, pp. 1-8.
Monasson et al., "Determining computational complexity from characteristic 'phase transitions'," Jul. 1999, Nature Magazine, vol. 400, pp. 133-137.
Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Niessen,S. and Ney, H, "Toward hierarchical models for statistical machine translation of inflected languages," 2001, Data-Driven Machine Translation Workshop, Toulouse, France, pp. 47-54.
Och, F. and Ney, H, "Improved Statistical Alignment Models," 2000, 38th Annual Meeting of the ACL, Hong Kong, pp. 440-447.
Och et al., "Improved Alignment Models for Statistical Machine Translation," 1999, Proc. of the Joint Conf. of Empirical Methods in Natural Language Processing and Very Large Corpora, pp. 20-28.
Papineni et al., "Bleu: a Method for Automatic Evaluation of Machine Translation," 2001, IBM Research Report, RC22176(WQ102-022).
Pla et al., "Tagging and Chunking with Bigrams," 2000, Proc. of the 18th Conference on Computational Linguistics, vol. 2, pp. 614-620.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Resnik, P. and Yarowsky, D. "A Perspective on Word Sense Disambiguation Methods and Their Evaluation," 1997, Proceedings of SIGLEX '97, Washington, D.C., pp. 79-86.
Resnik, Philip, "Mining the Web for Bilingual Text," 1999, 37th Annual Meeting of the ACL, College Park, MD, pp. 527-534.
Knight, Kevin, "Integrating Knowledge Acquisition and Language Acquisition", May 1992, Journal of Applied Intelligence, vol. 1J, No. 4.
Tanaka, K. and Iwasaki, H. "Extraction of Lexical Translations from Non-Aligned Corpora," Proceedings of COLING 1996 (NPL0187).
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ. (NPL0189).
Tomas, J., "Binary Feature Classification for Word Disambiguation in Statistical Machine Translation," Proceedings of the 2nd Int'l. Workshop on Pattern Recognition, 2002, pp. 1-12. (NPL0194).
Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114. (NPL0195).
Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation) (NPL0196).
Varga et al., "Parallel Corpora for Medium Density Languages", In Proceedings of RANLP 2005, pp. 590-596 (NPL0198).
Yamamoto et al, "Acquisition of Phrase-level Bilingual Correspondence using Dependency Structure" In Proceedings of COLING-2000, pp. 933-939 (NPL0214).
Zhang et al., "Synchronous Binarization for Machine Translations," Jun. 4-9, 2006, in Proc. of the Human Language Technology Conference of the North American Chapter of the ACL, pp. 256-263. (NPL0217).
Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223. (NPL0218).
Koehn, P. et al, "Statistical Phrase-Based Translation," Proceedings of HLT-NAACL 2003 Main Papers, pp. 48-54 Edmonton, May-Jun. 2003. (NPL0222).
Abney, S.P., "Stochastic Attribute Value Grammars", Association for Computional Linguistics, 1997, pp. 597-618 (NPL0223).
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf> (NPL0224).
Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf> (NPL0225).
Wang, W., et al. "Capitalizing Machine Translation" In HLT-NAACL '06 Proceedings Jun. 2006. <http://www.isi.edu/natural-language/mt/hlt-naacl-06-wang.pdf> (NPL0226).
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf> (NPL0227).
Agbago, A., et al., "True-casing for the Portage System," In Recent Advances in Natural Language Processing (Borovets, Bulgaria), Sep. 21-23, 2005, pp. 21-24. (NPL0002).
Alshawi, Hiyan, "Head Automata for Speech Translation", Proceedings of the ICSLP 96, 1996, Philadelphia, Pennslyvania. (NPL0011).
Ambati, V., "Dependency Structure Trees in Syntax Based Machine Translation," Spring 2008 Report <http://www.cs.cmu.edu/~vamshi/publications/DependencyMT_report.pdf>, pp. 1-8. (NPL0012).
Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41. (NPL0014).
Ballesteros, L. et al., "Phrasal Translation and Query Expansion Techniques for Cross-Language Information Retrieval," SIGIR 97, Philadelphia, Pa, © 1997, pp. 84-91. (NPL0015).

(56) References Cited

OTHER PUBLICATIONS

"Bangalore, S. and Rambow, O., ""Using TAGs, a Tree Model, and a Language Model for Generation,"" May 2000,Workshop TAG+5, Paris. (NPL0017)".
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. For Computational Linguistics, Morristown, NJ, 597-604. DOI=http://dx.doi.org/10.3115/1219840 (NPL0020).
Berhe, G. et al., "Modeling Service-based Multimedia Content Adaptation in Pervasive Computing," CF '04 (Ischia, Italy) Apr. 14-16, 2004, pp. 60-69. (NPL0023).
Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11. (NPL0025).
Brill, Eric, "Transformation-Based Error-Driven Learning and Natural Language Processing: A Case Study in Part of Speech Tagging", 1995, Assocation for Computational Linguistics, vol. 21, No. 4, pp. 1-37 (NPL0027).
Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1. (NPL0034).
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53. (NPL0037).
Cheung et al., "Sentence Alignment in Parallel, Comparable, and Quasi-comparable Corpora", In Proceedings of LREC, 2004, pp. 30-33 (NPL0038).
Cohen et al., "Spectral Bloom Filters," SIGMOD 2003, Jun. 9-12, 2003, ACM pp. 241-252 (NPL0041).
Cohen, "Hardware-Assisted Algorithm for Full-text Large-Dictionary String Matching Using n-gram Hashing," 1998, Information Processing and Management, vol. 34, No. 4, pp. 443-464. (NPL0042).
Covington, "An Algorithm to Align Words for Historical Comparison", Computational Linguistics, 1996,vol. 22, No. 4, pp. 481-496 (NPL0045).
Eisner, Jason, "Learning Non-Isomorphic Tree Mappings for Machine Translation," 2003, in Proc. of the 41st Meeting of the ACL, pp. 205-208. (NPL0050).
Fleming, Michael et al., "Mixed-Initiative Translation of Web Pages," AMTA 2000, LNAI 1934, Springer-Verlag, Berlin, Germany, 2000, pp. 25-29. (NPL0057).
Och, Franz Josef and Ney, Hermann, "Improved Statistical Alignment Models" ACLOO:Proc. of the 38th Annual Meeting of the Association for Computational Linguistics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract (NPL0058).
Ren, Fuji and Shi, Hongchi, "Parallel Machine Translation: Principles and Practice," Engineering of Complex Computer Systems, 2001 Proceedings, Seventh IEEE Int'l Conference, pp. 249-259, 2001. (NPL0059).
Fung et al, "Mining Very-Non-Parallel Corpora: Parallel Sentence and Lexicon Extraction via Bootstrapping and EM", In EMNLP 2004 (NPL0060).
Gale, W. and Church, K., "A Program for Aligning Sentences in Bilingual Corpora," 1993, Computational Linguisitcs, vol. 19, No. 1, pp. 75-102 (NPL0064).

Galley et al., "Scalable Inference and Training of Context-Rich Syntactic Translation Models," Jul. 2006, in Proc. of the 21st International Conference on Computational Linguistics, pp. 961-968. (NPL0065).
Galley et al., "What's in a translation rule?", 2004, in Proc. of HLT/NAACL '04, pp. 1-8. (NPL0066).
Gaussier et al, "A Geometric View on Bilingual Lexicon Extraction from Comparable Corpora", In Proceedings of ACL 2004, July (NPL0067).
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107. (NPL0070).
Grossi et al, "Suffix Trees and Their Applications in String Algorithms", In. Proceedings of the 1st South American Workshop on String Processing, Sep. 1993, pp. 57-76 (NPL0072).
Gupta et al., "Kelips: Building an Efficient and Stable P2P DHT thorough Increased Memory and Background Overhead," 2003 IPTPS, LNCS 2735, pp. 160-169. (NPL0073).
Habash, Nizar, "The Use of a Structural N-gram Language Model in Generation-Heavy Hybrid Machine Translation," University of Maryland, Univ. Institute for Advance Computer Studies, Sep. 8, 2004. (NPL0074).
Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247. (NPL0076).
Klein et al., "Accurate Unlexicalized Parsing," Jul. 2003, In Proc. of the 41st Annual Meeting of the ACL, pp. 423-430. (NPL0087).
Koehn, Philipp, "Noun Phrase Translation," A PhD Dissertation for the University of Southern California, pp. xiii, 23, 25-57, 72-81, Dec. 2003. (NPL0108).
Kupiec, Julian, "An Algorithm for Finding Noun Phrase Correspondences in Bilingual Corpora," In Proceedings of the 31st Annual Meeting of the ACL, 1993, pp. 17-22. (NPL0113).
Lita, L., et al., "tRuEcasIng," 2003, Proceedings of the 41st Annual Meeting of the Assoc. for Computational Linguistics (In Hinrichs, E. And Roth, D.—editors), pp. 152-159. (NPL0121).
Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4. (NPL0122).
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191. (NPL0133).
McDevitt, K. et al., "Designing of a Community-based Translation Center," Technical Report TR-03-30, Computer Science, Virginia Tech, © 2003, pp. 1-8. (NPL0134).
Metze, F. et al., "The NESPOLE! Speech-to-Speech Translation System," Proc. of the HLT 2002, 2nd Int'l Conf. on Human Language Technology (San Francisco, CA), © 2002, pp. 378-383. (NPL0139).
Mohri, Mehryar, "Regular Approximation of Context Free Grammars Through Transformation", 2000, pp. 251-261, "Robustness in Language and Speech Technology", Chapter 9, Kluwer Academic Publishers. (NPL0143).
Nagao, K. et al., "Semantic Annotation and Transcoding: Making Web Content More Accessible," IEEE Multimedia, vol. 8, Issue 2 Apr.-Jun. 2001, pp. 69-81. (NPL0146).
Norvig, Peter, "Techniques for Automatic Memoization with Applications to Context-Free Parsing", Compuational Linguistics,1991, pp. 91-98, vol. 17, No. 1 (NPL0149).
Och et al. "A Smorgasbord of Features for Statistical Machine Translation." HLTNAACL Conference. Mar. 2004, 8 pages. (NPL0151).
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096. (NPL0152).

(56) References Cited

OTHER PUBLICATIONS

Och, F. and Ney, H., "A Systematic Comparison of Various Statistical Alignment Models," Computational Linguistics, 2003, 29:1, 19-51. (NPL0155).
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324. (NPL0158).
Petrov et al., "Learning Accurate, Compact and Interpretable Tree Annotation," Jun. 4-9, 2006, in Proc. of the Human Language Technology Conference of the North American Chapter of the ACL, pp. 433-440. (NPL0159).
Qun, Liu, "A Chinese-English Machine Translation System Based on Micro-Engine Architecture," An Int'l Conference on Translation and Information Technology, Hong Kong, Dec. 2000, pp. 1-10. (NPL0161).
Zhang, R. et al., "The NiCT-ATR Statistical Machine Translation System for the IWSLT 2006 Evaluation," submitted to IWSLT, 2006. (NPL0173).
Kumar, S. and Byrne, W., "Minimum Bayes-Risk Decoding for Statistical Machine Translation." HLTNAACL Conference. Mar. 2004, 8 pages. (NPL0179).
Shirai, S., "A Hybrid Rule and Example-based Method for Machine Translation," 1997, NTT Communication Science Laboratories, pp. 1-5. (NPL0181).
Ueffing et al., "Using POS Information for Statistical Machine Translation into Morphologically Rich Languages," In EACL, 2003: Proceedings of the Tenth Conference on European Chapter of the Association for Computational Linguistics, pp. 347-354.
Frederking et al., "Three Heads are Better Than One," In Proceedings of the 4th Conference on Applied Natural Language Processing, Stuttgart, Germany, 1994, pp. 95-100.
Och et al., "Discriminative Training and Maximum Entropy Models for Statistical Machine Translation," In Proc. of the 40th Annual Meeting of the Association for Computational Linguistics (ACL), Philadelphia, PA, 2002.
Yasuda et al., "Automatic Machine Translation Selection Scheme to Output the Best Result," Proc. of LREC, 2002, pp. 525-528.
Papineni et al., "Bleu: a Method for Automatic Evaluation of Machine Translation", Proc. of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.
Proz.com, Rates for proofreading versus Translating, http://www.proz.com/forum/business_issues/202-rates_for_proofreading_versus_translating.html, Apr. 23, 2009, retrieved Jul. 13, 2012.
Celine, Volume discounts on large translation project, naked translations, http://www.nakedtranslations.com/en/2007/volume-discounts-on-large-translation-projects/, Aug. 1, 2007, retrieved Jul. 16, 2012.
Graehl, J and Knight, K, May 2004, Training Tree Transducers, In NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action mailed Jun. 7, 2004 in Canadian Patent Application 2408819, filed May 11, 2001.
First Office Action mailed Jun. 14, 2007 in Canadian Patent Application 2475857, filed Mar. 11, 2003.
Office Action mailed Mar. 26, 2012 in German Patent Application 10392450.7, filed Mar. 28, 2003.
First Office Action mailed Nov. 5, 2008 in Canadian Patent Application 2408398, filed Mar. 27, 2003.
Second Office Action mailed Sep. 25, 2009 in Canadian Patent Application 2408398, filed Mar. 27, 2003.
First Office Action mailed Mar. 1, 2005 in European Patent Application No. 03716920.8, filed Mar. 27, 2003.
Second Office Action mailed Nov. 9, 2006 in European Patent Application No. 03716920.8, filed Mar. 27, 2003.
Third Office Action mailed Apr. 30, 2008 in European Patent Application No. 03716920.8, filed Mar. 27, 2003.
Office Action mailed Oct. 25, 2011 in Japanese Patent Application 2007-536911 filed Oct. 12, 2005.
Office Action mailed Jul. 24, 2012 in Japanese Patent Application 2007-536911 filed Oct. 12, 2005.
Final Office Action mailed Apr. 1, 2013 in Japanese Patent Application 2007-536911 filed Oct. 12, 2005.
Office Action mailed May 13, 2005 in Chinese Patent Application 1812317.1, filed May 11, 2001.
Office Action mailed Apr. 21, 2006 in Chinese Patent Application 1812317.1, filed May 11, 2001.
Office Action mailed Jul. 19, 2006 in Japanese Patent Application 2003-577155, filed Mar. 11, 2003.
Office Action mailed 2007 in Chinese Patent Application 3805749.2, filed Mar. 11, 2003.
Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, in Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, in Proceedings of AMTA, pp. 1-8.
Notice of Allowance mailed Dec. 10, 2013 in Japanese Patent Application 2007-536911, filed Oct. 12, 2005.
Huang et al. Automatic Extraction of Named Entity Translingual Equivalence Based on Multi-Feature Cost Minimization. In Proceedings of the ACL 2003 Workshop on Multilingual and Mixed-Language Name Entry Recognition.

\* cited by examiner ized differently and a connection is not always maintained between translated versions of the same story, URLs of articles may be unreliable. Further, a news website may contain comparable segments of text that relate to the same news story, but the comparable segments or articles should not necessarily be identified as parallel documents. Comparable segments may be referred to as "noisy translations" of the sentences.

SYSTEMS AND METHODS FOR IDENTIFYING PARALLEL DOCUMENTS AND SENTENCE FRAGMENTS IN MULTILINGUAL DOCUMENT COLLECTIONS

CROSS-REFERENCE

This United States nonprovisional patent application claims the benefit of U.S. provisional application No. 60/790,131 filed Apr. 7, 2006 and entitled "Systems and Methods for Identifying Parallel Documents and Sentence Fragments in Multilingual Document Collections" which is incorporated by reference herein.

GOVERNMENT INTERESTS

The research and development described in this application were supported by the GALE program of the Defense Advanced Research Projects Agency (DARPA), Contract No. HR0011-06-C-0022. The U.S. government may have certain rights in the claimed inventions.

BACKGROUND

1. Field of the Invention

The present invention relates generally to statistical machine translation of multilingual documents and more specifically to systems and methods for identifying parallel segments in multilingual document collections.

2. Description of the Related Art

In the field of statistical machine translation, large collections of training data are required to develop and implement systems and methods for translating documents. Training data comprises parallel segments which are documents or fragments that are literal, or parallel, translations of each other in two languages. Currently, there is a lack of sufficiently large parallel corpora for most language pairs. A language pair refers to the two languages used within the parallel corpora. Examples of language pairs include English-Romanian or English-Arabic.

Large volumes of material in many languages are produced daily, and in some instances, this material may comprise translational equivalents. For example, a news story posted on the World Wide Web (WWW) on an English-language website may be a translation of the same story posted on a Romanian-language website. The ability to identify these translations is important for generating large collections of parallel training data.

However, because news web pages published on a news website typically have the same structure. As such, structural properties, such as HTML structures, can not be used to identify parallel documents. Further, because web sites in different languages are often organized differently and a connection is not always maintained between translated versions of the same story, URLs of articles may be unreliable. Further, a news website may contain comparable segments of text that relate to the same news story, but the comparable segments or articles should not necessarily be identified as parallel documents. Comparable segments may be referred to as "noisy translations" of the sentences.

However, these comparable segments may include one or more parallel fragments that can be added to the training data even though the entire segment is not a parallel translation of a comparable segment. For example, a quote within a news article may be translated literally even though the rest of the document is merely related to a comparable segment in another language.

Current methods perform computations at a word level and do not distinguish parallel translations of documents from comparable documents. As such, these methods result in many false positives where a comparable document may be erroneously classified as a parallel translation.

SUMMARY

Systems, computer programs, and methods for identifying parallel documents and/or fragments in a bilingual collection are provided. The method for identifying parallel sub-sentential fragments in a bilingual collection comprises translating a source document from a bilingual collection. The method further includes querying a target library associated with the bilingual collection using the translated source document, and identifying one or more target documents based on the query. Subsequently, a source sentence associated with the source document is aligned to one or more target sentences associated with the one or more target documents. Finally, the method includes determining whether a source fragment associated with the source sentence comprises a parallel translation of a target fragment associated with the one or more target sentences.

DETAILED DESCRIPTION

A system and method for identifying parallel documents and/or fragments in a bilingual document collection is provided. The present method and system can be used with documents posted on the Internet without relying on properties such as page structure or URL. Further, the system and method is able to distinguish between parallel documents and comparable documents. The method and system may alternatively or additionally be used to extract parallel fragments from comparable corpora at the sub-sentential level to increase the amount of parallel data for statistical machine translation (SMT).

Figure 1:
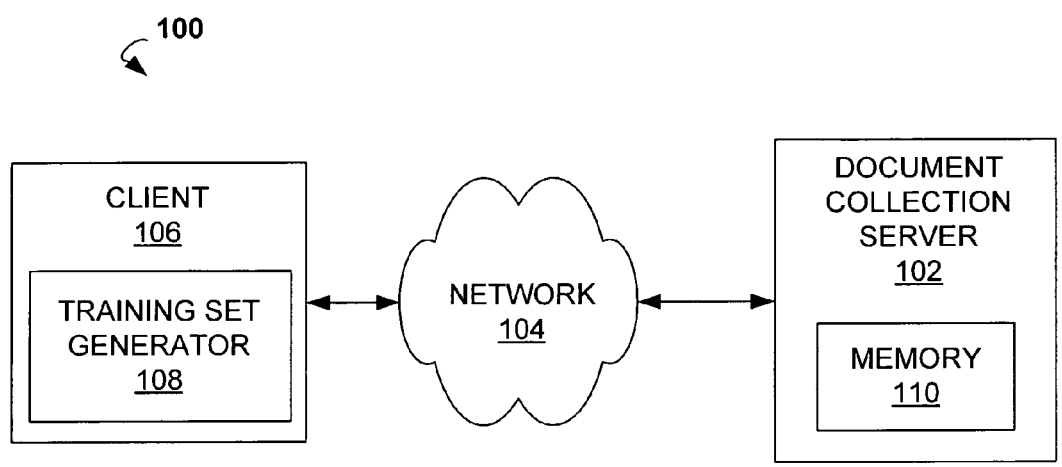
FIG. 1 depicts an illustration of an environment in which some embodiments may be practiced.

FIG. 1 depicts an illustration of an environment 100 in which some embodiments may be practiced. The environment 100 may comprise a document collection server 102 communicatively connected to a client 106 via a network 104. The document collection server 102 may comprise a memory 110 configured to store one or more bilingual document collections, one or more parallel documents, one or more parallel fragments, and/or one or more set of annotations indicating parallel data. The document collection server 102 may comprise a processor configured to access the memory 110 and process instructions. The document collection server 102 may communicate over the network 104 using a communications interface. The network 104 may comprise a public network (e.g., the Internet) or a private network. The client 106 may include storage, a display, or additional functionality beyond the scope of the embodiments.

The client 106 may comprise a computational device such as a personal computer. The client 106 may include a training set generator 108. The training set generator 108 may comprise hardware, software, or firmware and may be configured to identify parallel documents and/or fragments in bilingual collections. The training set generator 108 may be configured to access bilingual collections stored in the document collection server 102. Further, the training set generator 108 may transmit data indicating parallel documents or fragments to the document collection server 102.

Figure 2:
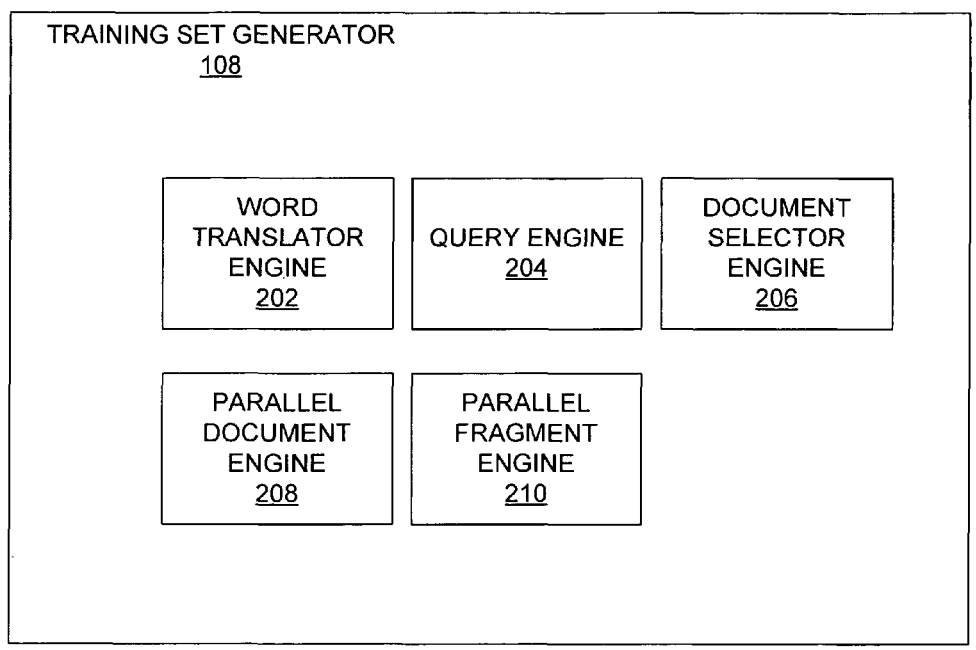
FIG. 2 depicts a block diagram illustrating an exemplary training set generator according to exemplary embodiments.

FIG. 2 depicts a block diagram illustrating an exemplary training set generator, such as the training set generator 108 of FIG. 1, according to exemplary embodiments. The training set generator 108 may identify parallel documents and/or fragments within bilingual document collections. The bilingual document collections may comprise documents collected from the Internet or the World Wide Web (WWW) in exemplary embodiments. The training set generator 108 may comprise a word translator engine 202, a query engine 204, a document selector engine 206, a parallel document engine 208, and a parallel fragment engine 210. Because sentence alignment requires a large amount of computations, the word translator engine 202, and the query engine 204 may be configured to reduce the number of documents with which sentence alignment is performed.

The word translator engine 202 is configured to translate each word within a source document to generate a translated source document. A source document is a document in the bilingual document collection of which a parallel translation is sought. The source document, for example, may comprise a news article written in English. For example, the training set generator 108 may be configured to determine whether any documents written in Romanian associated with a target library are parallel translations of, or contain parallel translations of fragments of, the source document.

A target library comprises one or more target documents. Target documents may include documents or segments that possibly comprise a parallel translation of the source document. Target documents may be obtained from sources such as the Internet or other known libraries and may be classified according to a classifier such as date, URL, or the like. The word translator engine 202 translates the source document word-by-word or literally into the language of the target library. To further the example, the news article written in English is translated word-by-word into Romanian, which may be utilized as the language of the target library.

The query engine 204 is configured to query the target library using the translated source document. The query engine 204 selects a subset comprising the documents that are most similar to the translated source document. The subset may be limited to the top N documents. In some embodiments, N may be a constant such as the number twenty (20).

The document selector engine 206 aligns one or more target sentences in each of the target documents in the subset to one or more sentences in the source document. By aligning the sentences, the training set generator 108 avoids falsely classifying documents as parallel based only on word-level comparisons. Based on the sentence alignments, the document selector engine 206 may discard one or more of the top N documents that, while comprising word-level translations, do not comprise sentence-level translations. For example, the document selector engine 206 may discard documents that do not have a specified number of sentences that can be aligned. In other embodiments, the document selector engine 206 may discard sentence pairs within the aligned documents that do not contain a specified number or percentage of words that are translations of each other. By aligning sentences within the source documents and the target documents, the training set generator 108 can distinguish parallel documents from comparable documents.

The parallel document engine 208 is configured to determine whether a document pair comprising the source document and the target document is a parallel translation. The parallel document engine 208 is discussed further with respect to FIG. 3 and FIG. 6.

The parallel fragment engine 210 is configured to identify parallel sentence fragments in non-parallel document pairs such as document pairs from news sources on the Internet. The parallel fragment engine 210 is discussed further in FIG. 4, FIG. 8, and FIG. 9. Although FIG. 2 shows various engines comprising the training set generator 108, fewer or more engines may comprise the training set generator 108 and still fall within the scope of the various embodiments.

Figure 3:
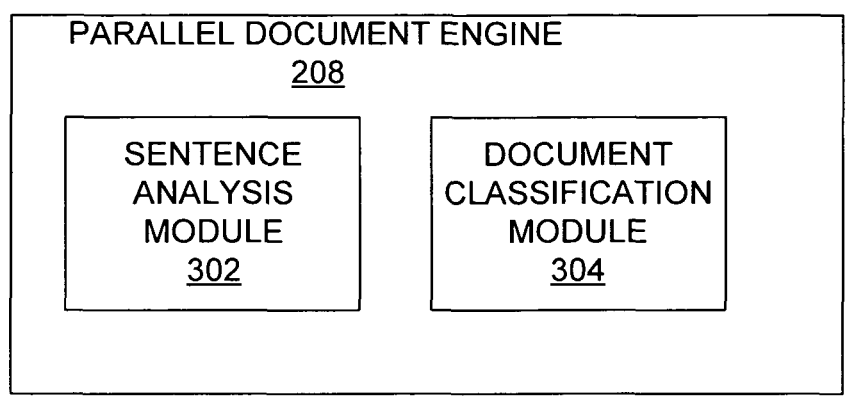
FIG. 3 depicts a block diagram illustrating an exemplary parallel document engine according to exemplary embodiments.

FIG. 3 depicts a block diagram illustrating an exemplary parallel document engine 208 according to exemplary embodiments. The parallel document engine 208 determines whether the target document is the parallel translation of the source document. The parallel document engine 208 comprises a sentence analysis module 302 and a document classification module 304.

The sentence analysis module 302 determines whether aligned sentences based on the sentence alignments generated by the document selector engine 206 are translations of each other independently of the context within the document or segment. The sentence analysis module 302 inspects the sentence pairs between the sentences in the source document and the sentences in each of the documents in the subset comprising the documents that are most similar to the translated source document to compute sentence-level links. The sentence analysis module 302 distinguishes between parallel and non-parallel sentence pairs based on sentence features that can be extracted from a word-level alignment of the two aligned sentences. The sentence features are identified by linking each word in the sentences with its best translation candidate in the paired sentence. This linking process may be referred to as "greedily linking."

Features that can be extracted by greedily linking include, for example, the percentage of words that are aligned, contiguous phrases that are aligned, and contiguous phrases that are not aligned. After the features have been extracted, a Maximum Entropy-based parallel sentence classifier (not shown) may be trained to obtain positive and negative classifiers for the sentences. In exemplary embodiments, the following Maximum Entropy probability equation may be used:

$$P(c_i \mid sp) = \frac{1}{Z(sp)} \prod_{j=1}^{k} \lambda_j^{f_{ij}(c,sp)}$$

where $c_i$ is the class ($c_0$="parallel", $c_1$="not parallel"), sp is the percentage of words in a sentence pair that have a translation in the other sentence of the sentence pair. Z(sp) is a normalization factor, and $f_{ij}$ are the feature functions (indexed both by class and by feature). A feature function, f(sp), is defined as the value of the word overlap of the sentences in the sentence pair sp. The resulting model has free parameters $\lambda_j$, the feature weights. The parameter values that maximize the likelihood of a given training corpus can be computed using known optimization algorithms. Based on the positive and negative classifiers, sentence level links between the source document and the documents within the subset are obtained.

The document classification module 304 is configured to select the document within the subset that shares the most sentence level links with the source document. The document within the subset that shares the most sentence-level links with the source document is referred to as the target document. The document classification module 304 then determines whether the target document is a parallel translation of the source document by comparing the length of the target document to the length of the source document and determining whether a noisy sentence threshold and a monotone sentence threshold are met. This process is described in greater detail in association with FIG. 6. The output of the document classification module 304 may comprise an annotation indicating that the target document is a parallel translation of the source document.

Figure 4:
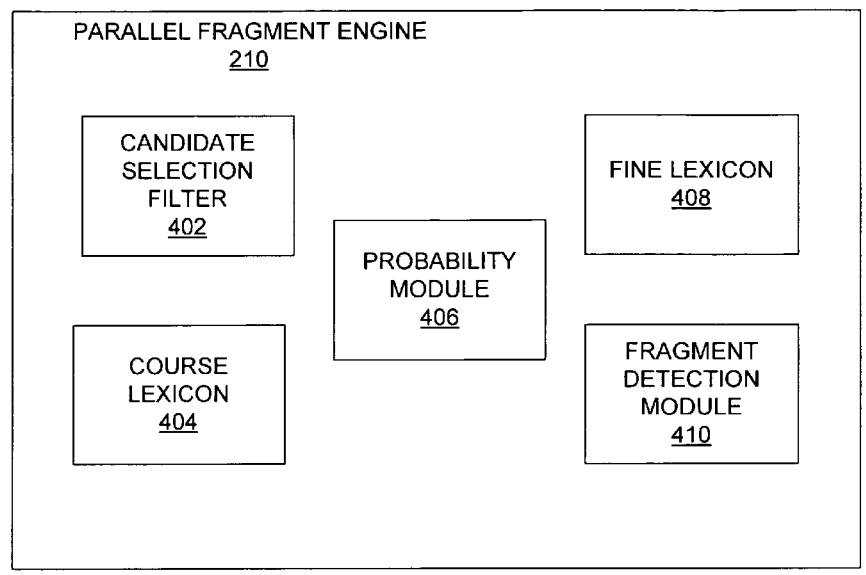
FIG. 4 depicts a block diagram illustrating an exemplary parallel fragment engine according to exemplary embodiments.

FIG. 4 depicts a block diagram illustrating an exemplary parallel fragment engine 210 according to exemplary embodiments. The parallel fragment engine 210 may be configured to extract parallel sentence fragments from within non-parallel corpora. Thus, the parallel fragment engine 210 is configured to determine whether a sentence fragment in the source document is a parallel translation of a sentence fragment in the target document. For example, if the document classification module 304 determines that the source document and the target document are non-parallel, that is the target document is not a parallel translation of the source document, the documents are likely to be comparable documents. Comparable documents may also be referred to as "noisy translations." The comparable documents may comprise sub-sentential parallel fragments that may be extracted by the parallel fragment engine 210 and added to a training data set. The parallel fragment engine 210 may comprise a candidate selection filter 402, a coarse lexicon 404, a probability module 406, a fine lexicon 408, and a fragment detection module 410.

The candidate selection filter 402 discards sentence pairs in the subset comprising the segments or documents selected by the document selection engine 206. The candidate selection filter 402 discards sentence pairs that have very few words that are translations of each other based on the coarse lexicon 404. For example, sentence pairs that comprise three or fewer words that appear in both the source sentence and the target sentence may be discarded. In other embodiments, sentence pairs may be discarded according to a percentage of words appearing in both the source sentence and the target sentence.

The coarse lexicon 404 comprises a probabilistic lexicon derived from an initial parallel corpus such as a training data set. The coarse lexicon 404 may be obtained by running a GIZA++ implementation of the IBM word alignment models on the initial parallel corpus. In the coarse lexicon, each source word may be associated with many possible translations. For example, in some embodiments, each source word is associated with, on average, twelve possible translations. Each of these possible translations may be further associated with a probability. The coarse lexicon is used to retain most of the existing comparable sentences occurring between the source document and the target document.

The probability module 406 is configured to greedily link each word in the source sentence to the best translation occurring in the target sentence. Using the fine lexicon 408, the probability module 406 then assigns values to each word alignment indicating the probability that the source word is properly aligned with, or a translation of, the target word. The probability module 406 may filter these values further. The fine lexicon 408 may be generated in exemplary embodiments according to the process discussed in connection with FIG. 8.

The fragment detection module 410 may be configured to detect a parallel sentence fragment based on the values assigned to each word alignment based on the fine lexicon 408. In some embodiments, the fragment detection module 410 may further filter the fragment matches. This process is discussed in greater detail in connection with FIG. 7. The output of the parallel fragment engine 210 comprises at least one parallel fragment that may be added to the training set.

Figure 5:
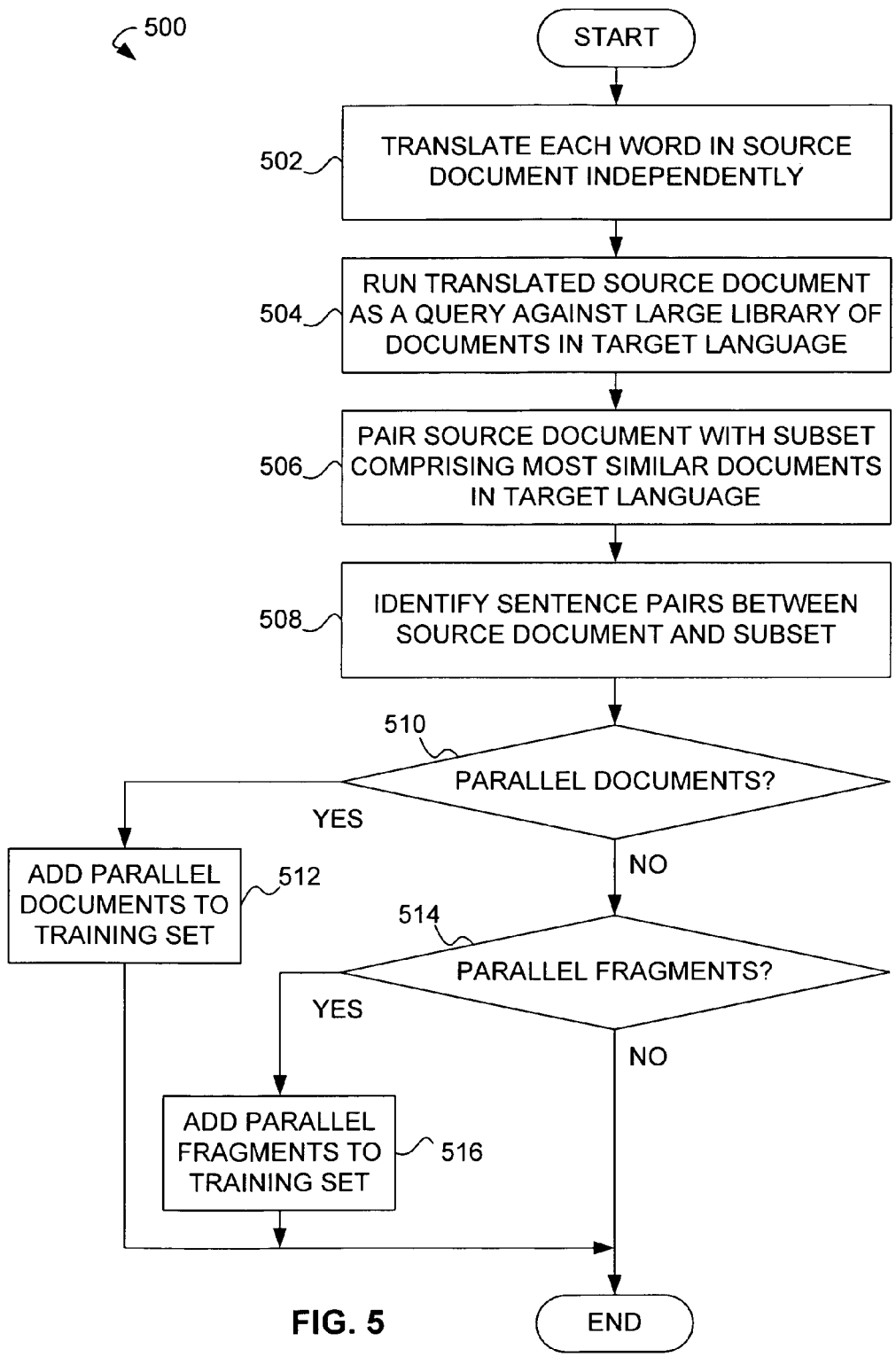
FIG. 5 depicts a flowchart illustrating an exemplary process for automatically generating parallel corpora from multilingual document sources according to exemplary embodiments.

FIG. 5 depicts a flowchart illustrating an exemplary process 500 for automatically generating parallel corpora from bilingual document sources according to exemplary embodiments. The process 500 identifies parallel segments and fragments in the bilingual documents according to sentence pairs identified between the documents. The process 500 may be used to generate a training set for statistical machine translation (SMT). The process 500 comprises accessing a bilingual document collection, translating words in a source document, querying a target library using the translated source document, selecting a subset comprising a target document from the target library, aligning the sentences in the source document with sentences in the target document, and determining whether the source document is a parallel translation of the target document. The method may alternatively or additionally include determining whether a fragment in the source document is parallel to a fragment in the target document. If the source document or a fragment thereof is a parallel translation of the target document, the parallel portions may be stored within a training set.

At step 502, each word in the source document is independently translated into the language of the target document to generate a translated source document. The words may be translated according to a dictionary, for example.

At step 504, the translated source document is run as a query against a large library comprising documents written in the target language. In step 506, the source document is paired with a subset comprising the most similar documents written in the target language according to the results of the query. In some embodiments, the subset may be limited to a constant number, N, of the most similar documents. N may be any number up to and including the number of documents in the target library. N may be limited by a computational capacity of a computer such as client 106.

At step 508, parallel sentence pairs between the source document and the documents in the subset are identified. The sentence pairs may be identified by the sentence analysis module 302.

After the sentence pairs are computed in step 508, step 510 is performed to determine whether the source document and at least one of the documents in the subset are parallel translations. In some embodiments, the parallel document engine 208 may perform this determination. The process used in step 510 is discussed in greater detail in connection with FIG. 6. If the documents are parallel, the parallel documents are added to the training set in step 512. In other embodiments, step 510 may not be performed and the process 500 proceeds to step 514 without determining whether any documents are parallel translations of each other.

If the documents are not parallel, step 514 is performed to determine whether there are parallel fragments in the paired documents. In some embodiments, the parallel fragment engine 210 may perform this determination. The process used in step 514 is discussed in greater detail in connection with FIG. 7 and FIG. 8. If there are parallel fragments in the sentences, the parallel fragments are added to the training set in step 516. In other embodiments, the process 500 may not perform step 514 and may instead terminate after performing steps 510 and 512.

Figure 6:
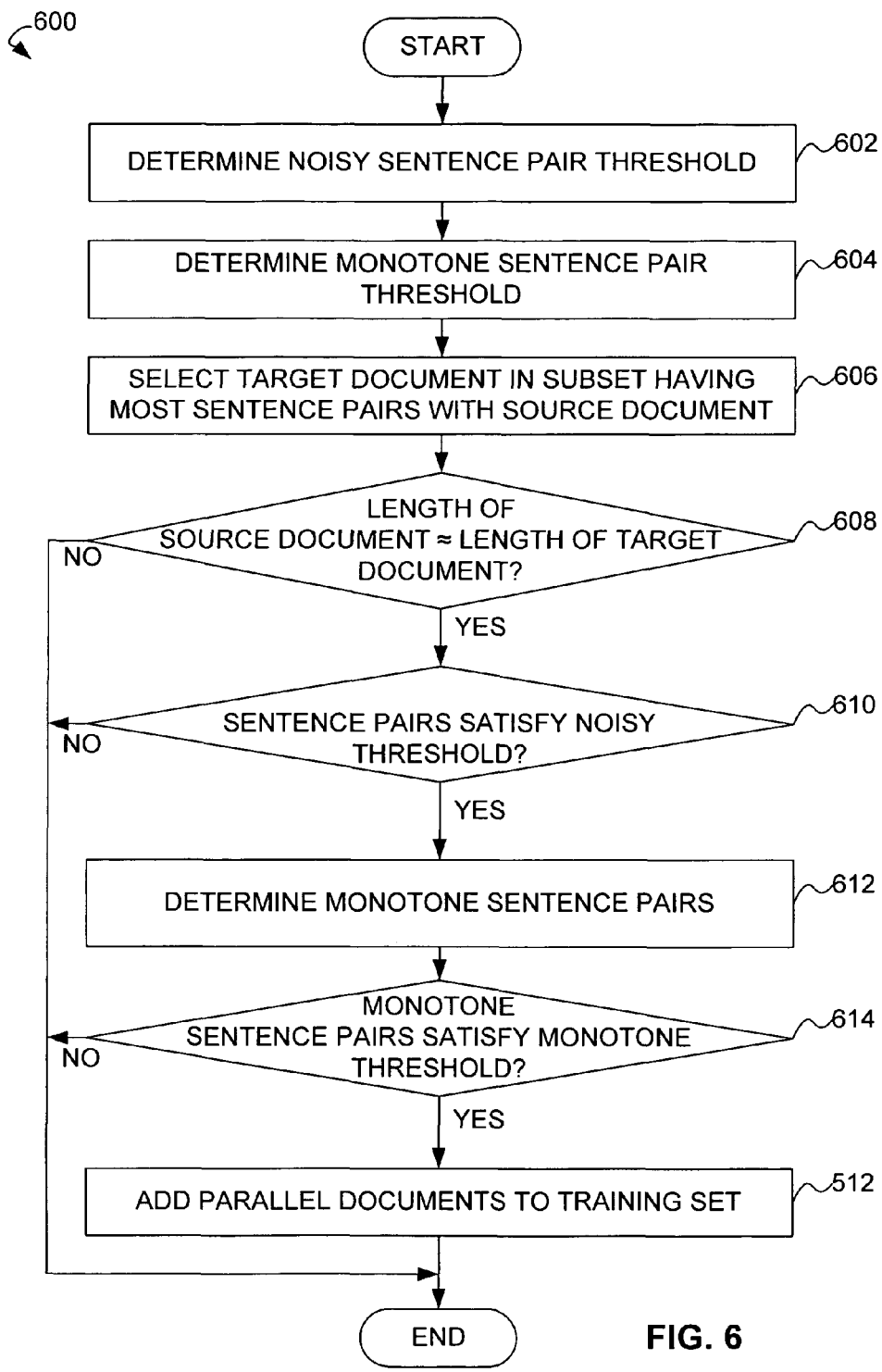
FIG. 6 depicts a flowchart of an exemplary process for determining whether documents are parallel based on sentence alignments according to exemplary embodiments.

FIG. 6 depicts a flowchart of a process 600 for determining whether a source document is a parallel translation of a document in the subset based on sentence alignments, according to exemplary embodiments. The process 600 may be performed as step 510 in process 500. In some embodiments, the process 600 may be performed by the parallel documents engine 208.

In step 602, a noisy sentence pair threshold is determined. A noisy sentence pair is a sentence pair comprising a first sentence that is at least a rough translation of one or more second sentences. For example, the first sentence may include the words, in a first language, "Mary went to the park with her dog," while the second sentence may include the words, in a second language, "Mary went to the park." In some embodiments, the noisy sentence threshold may be a percentage of the sentences in the source document. The noisy sentence threshold, for example, may be thirty percent (30%) of the sentences in the document.

At step 604, a monotone sentence pair threshold is determined. A monotone sentence pair is a sentence pair comprising words that have a high probability of being a parallel translation of one another. In exemplary embodiments, the monotone sentence pair may be a percentage of the noisy sentences. For example, the monotone sentence pair threshold may be ninety percent (90%) of the noisy sentence pairs. The noisy sentence pair threshold and the monotone sentence pair may be determined initially and/or later adjusted according to the accuracy of the identification of the parallel documents.

At step 606, the target document in the subset selected in step 506 having the most sentence pairs aligned with the source document according to step 508 is selected. After step 606, a series of determinations is made to determine whether the source document is a parallel translation of the target document. If the outcome of any of these determinations is negative, the source document is not determined to be parallel to the target document.

At step 608, comprises determining whether the length of the source document is approximately equal to the length of the target document is determined. Step 608 may be performed by the document classification module 304. This determination may be made according to the number of sentences present in the target document and in the source document. In some embodiments, the lengths of the documents are approximately equal if the length difference is no more than twenty-five percent (25%) of each of their lengths.

At step 610, if the target document and the source document are approximately the same length, the document classification module 304 may, in exemplary embodiments, determine whether the number of sentence pairs identified between the target document and the source documents satisfies the noisy sentence threshold.

If the noisy sentence threshold is satisfied, the monotone sentence pairs between the target document and the source document are identified, in step 612. The monotone sentence pairs may be identified from the noisy sentence pairs previously identified. At step 614, whether the number of identified monotone sentence pairs satisfies the monotone sentence threshold determined in step 604 is determined. This determination may be performed by the document classification module 304, in accordance with exemplary embodiments.

If the monotone sentence threshold is satisfied, the source document and the target document are identified as parallel and added to the training set, in step 512. The steps performed in process 600 may be reordered or performed substantially simultaneously and still fall within the scope of exemplary embodiments. Additional determinations known by those skilled in the art may be added to process 600 and still be within the scope of various embodiments.

Figure 7:
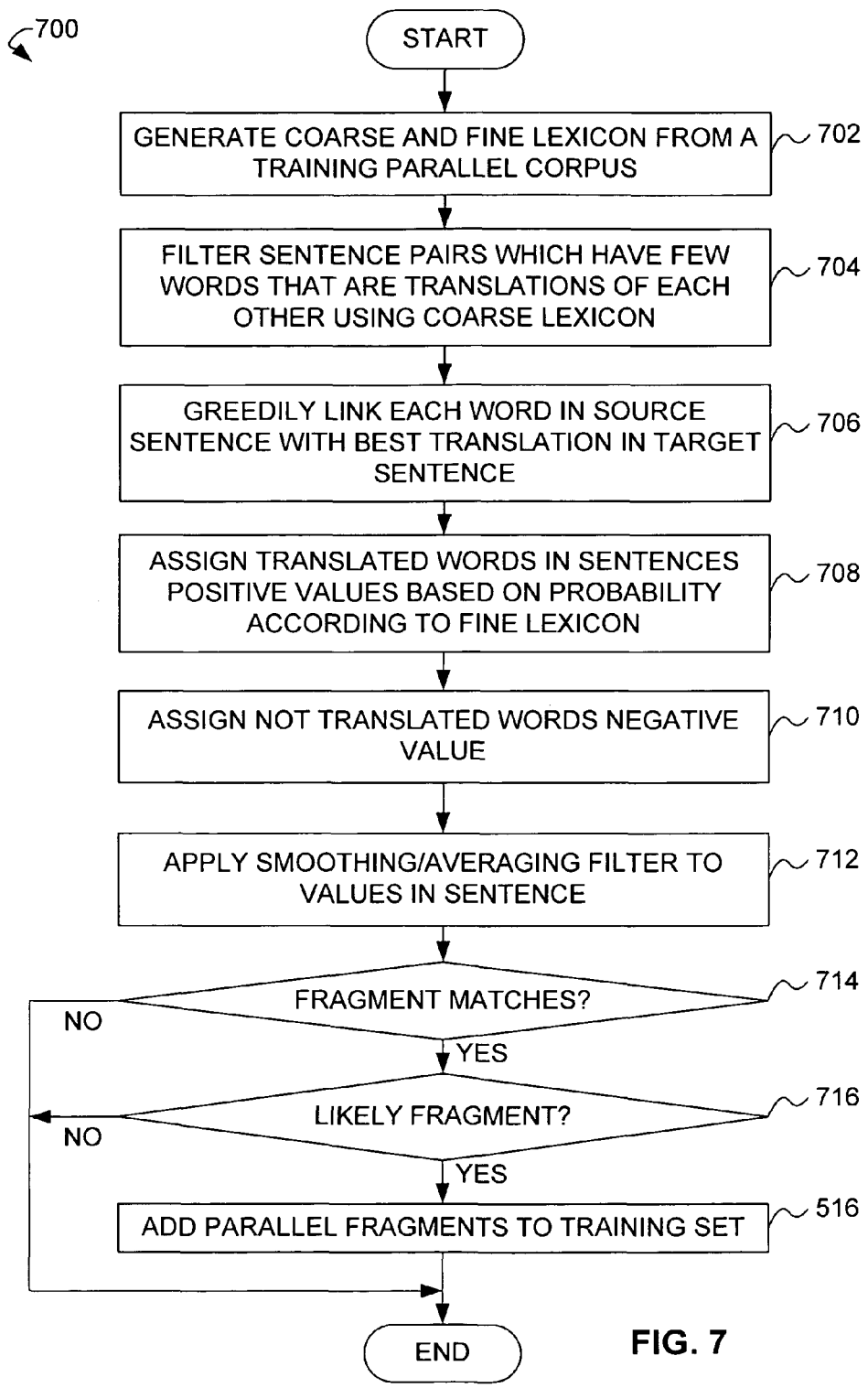
FIG. 7 depicts a flowchart of an exemplary process for extracting parallel sentence fragments from comparable corpora according to exemplary embodiments.

FIG. 7 depicts a flowchart of a process 700 for extracting parallel sentence fragments from comparable corpora, according to exemplary embodiments. In exemplary embodiments, the parallel fragment engine 210 may perform process 700. Parallel sentence fragments comprise sub-sentential parallel translations found within documents in bilingual collections. For example, corpora may be comparable if the source document and the target document are determined to not be parallel according to the process 600.

To extract parallel sentence fragments, a coarse lexicon and a fine lexicon are generated from an existing parallel training corpus in step 702. In exemplary embodiments, the coarse lexicon may comprise the coarse lexicon 404 and the fine lexicon may comprise the fine lexicon 408, discussed in FIG. 4. The coarse lexicon may be generated by running the GIZA++ implementation of the IBM word alignment models. The coarse lexicon is configured to identify most of the existing parallel data. The fine lexicon may be generated according to the process described in connection with FIG. 8 according to exemplary embodiments.

At step 704, sentence pairs which have few words that are translations of each other using the coarse lexicon are discarded. A lack of parallel words in a sentence pair according to the coarse lexicon indicates that it is unlikely that there are parallel fragments within the sentence pair.

At step 706, each word in the source sentence is greedily linked to the best translation in the target sentence. The word linkages are a way to quantify the differences between source sentences that are "mostly translated" and "mostly not translated" in the target sentences. By representing the target sentence as a numeric signal where translated words correspond to a positive value and not translated words correspond to a negative value, the process 700 is able to retain fragments within the sentence that are mostly positive. The word linkages may then be assigned a specific numerical value in steps 708 and 710.

At step 708, a positive value is assigned to the word linkages that indicate translated words in the sentence pair. The positive value corresponds to a positive dependency of the linked words. The numerical value is retrieved or otherwise accessed from the fine lexicon generated in step 702 based on the linked words.

At step 710, not translated words in the sentence pair are assigned a negative value to indicate that there is little or no probability that the words can, or should be, linked. In some embodiments, the value assigned to the not translated words is negative one (−1).

At step 712, a smoothing filter is applied to the numerical signal generated according to the sentence pair to obtain a filtered signal. In some embodiments, the smoothing filter may comprise an averaging filter which sets the value at each point to be the average of several values surrounding the value. For example, the surrounding five (5) values may be averaged.

At step 714, fragment matches within the sentence pair are determined. If there is a parallel fragment in the sentence pair, the positive fragments having a corresponding positive filtered signal are retained. If there is no fragment match, or the filtered signal is negative, the sentence pair is discarded.

At step 716, unlikely matching fragments are discarded. The application of the smoothing filter may, for example, distort the signal to produce a short fragment that is a false positive. For example, in some embodiments, fragments comprising less than three words may be discarded to avoid false positives. If the fragments that are likely to be a false positive are discarded, the process 700 returns to step 516 comprising adding the parallel fragments to the training set.

Figure 8:
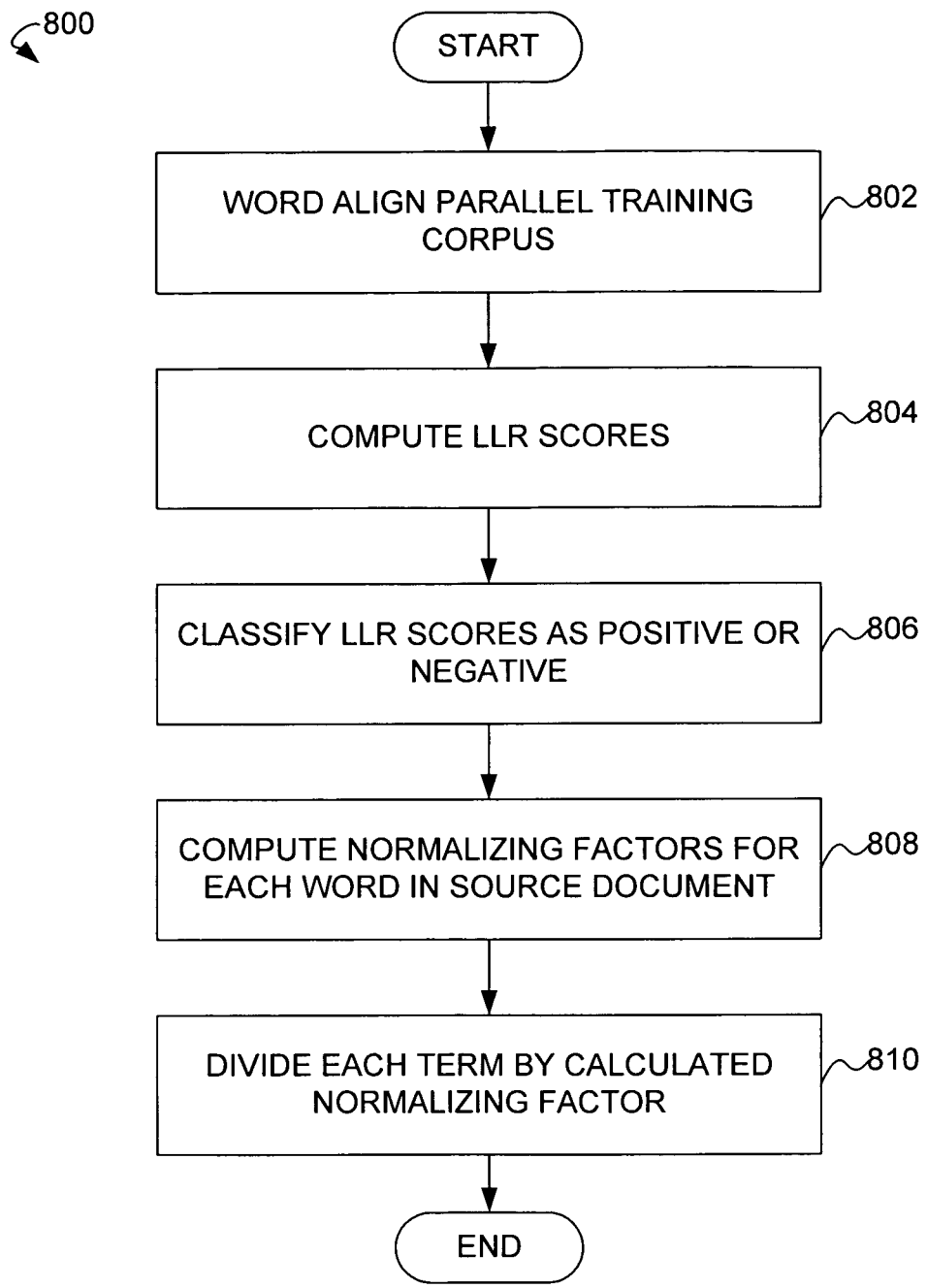
FIG. 8 depicts a flowchart of an exemplary process for generating a fine lexicon according to exemplary embodiments.

FIG. 8 depicts a flowchart of a process 800 for generating a fine lexicon, such as the fine lexicon 408, according to exemplary embodiments. The fine lexicon comprises fewer possible translations (e.g., an average of five (5) possible translations for each source word) for each source word than the coarse lexicon (e.g., coarse lexicon 404 which may comprise an average of twelve (12) possible translations). Thus, the fine lexicon is used to identify the fragment pairs that are likely to be parallel translations. For each possible translation, the fine lexicon comprises a positive numerical probability that the target word is a translation of the source word. Additionally, the fine lexicon also comprises a negative numerical probability that a target word is not a translation of a source word.

At step 802, a parallel training corpus is word aligned. Word aligning the parallel training corpus generates annotations in the parallel training corpus indicating that a word in the target language is a possible translation of a word in the source language.

At step 804, a Log-Likelihood-Ratio (LLR) score is calculated to measure the likelihood that a source word and a target word are not independent. The LLR score is used to estimate the independence of pairs of words which cooccur in a parallel corpus. According to exemplary embodiments, the source word and the target word will cooccur in the source document and the target document if the two words are also linked together in the word aligned parallel training corpus. According to some embodiments, the LLR score may be computed using the equation:

$$LLR_{score} = \sum_{t? \in \{t, -t\}} \sum_{s? \in \{s, -s\}} C(t?, s?) \log\left(\frac{p(t?|s?)}{p(t?)}\right)$$

corresponding words that are linked together in the respective target and source language sentences of an aligned sentence pair. In this equation, −t and −s are the corresponding words that are not aligned in the respective sentences. The variables t? and S? range over these values, and C(t?, s?) is the observed joint count for the values of t? and s?. The probabilities in the formula refer to maximum likelihood estimates.

At step 806, both a positive probability and a negative probability are determined based on classifying the LLR score as indicating a positive association or a negative association. The positive probability estimates the probability that the target word translates into the source word. The negative probability estimates the probability that the target word does not translate into the source word.

At step 808, normalizing factors for each word in the source document are computed. One normalizing factor is based on the summation of the positive LLR scores while a second normalizing factor is based on a summation of the negative LLR scores.

At step 810, each term, or value associated with each word alignment, is divided by the corresponding normalizing factor calculated in step 808. In further embodiments of the fine lexicon, the probability distributions may be recalculated by reversing the source language and the target language. The reversed probability distributions may be calculated using process 800.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with various embodiments. Those skilled in the art are familiar with instructions, processor(s), and storage medium.

While various embodiments have been described above, it should be understood that they have been presented by way of example only, and not limitation. For example, any of the elements associated with the training set generator 108 may employ any of the desired functionality set forth hereinabove. Thus, the breadth and scope of a preferred embodiment should not be limited by any of the above-described exemplary embodiments.

What is claimed is:

1. A method for identifying parallel sub-sentential fragments in a bilingual collection of documents, the method comprising:
    translating a source document in the bilingual collection of documents using a processor configured to perform statistical machine translation;
    querying a target library associated with the bilingual collection of documents using the translated source document using a query engine of the processor;
    identifying a plurality of target documents in the target library that are most similar to the translated source document, based on the query, using the query engine;
    aligning a source sentence associated with the source document to one or more target sentences associated with each of the plurality of identified target documents to generate one or more aligned sentence pairs, using a document selector engine of the processor;
    discarding an aligned sentence pair based on a number of words in the sentence pair that are translations of each other, using the document selector engine; and
    determining for each of the aligned sentence pairs that have not been discarded whether a source fragment in the source sentence comprises a parallel translation of a target fragment in the target sentence based on a number of words in the source fragment that are translations of words in the target fragment, the determining performed using a parallel document engine of the processor and comprising:
        determining a percentage of words that are aligned in each sentence pair of the target document using greedily linking, determining a number of sentence pairs in the target document that are parallel sentence pairs based on the percentage of words that are aligned in each sentence pair, and selecting the target document as being a parallel translation of the source document according to a number of parallel sentence pairs in the target document.

2. The method recited in claim 1 further comprising discarding a sentence pair based on a number of words that are translations of each other determined according to a coarse lexicon.

3. The method recited in claim 2 further comprising assigning a translation probability to words greedily linked in the aligned source sentence, and based on a numerical value retrieved from a fine lexicon.

4. The method recited in claim 3 further comprising detecting a parallel fragment based on a threshold associated with a number of essentially continuous words assigned a positive translation probability.

5. The method recited in claim 1 further comprising determining whether the source document comprises a parallel translation of the target document based on a number of sentences that can be aligned in the source document and the target document.

6. A computer program embodied on a non-transitory computer readable medium having instructions for identifying parallel sub-sentential fragments in a bilingual collection, the instructions comprising the steps:

translating a source document from a bilingual collection;

querying a target library associated with the bilingual collection using the translated source document;

identifying one or more target documents based on the query;

aligning a source sentence associated with the source document to one or more target sentences associated with the one or more target documents; and determining whether a source fragment associated with the source sentence comprises a parallel translation of a target fragment associated with the one or more target sentences, the determination comprising:

determining a percentage of words that are aligned in each sentence pair of the target document using greedily linking, determining a number of sentence pairs in the target document that are parallel sentence pairs based on the percentage of words that are aligned in each sentence pair, and selecting the target document as being a parallel translation of the source document according to a number of parallel sentence pairs in the target document.

7. The computer program recited in claim 6 further comprising an instruction for discarding the one or more target sentences based on a coarse lexicon.

8. The computer program recited in claim 7 further comprising an instruction for assigning a translation probability to words in the aligned source sentence based on a fine lexicon.

9. The computer program recited in claim 8 further comprising an instruction for detecting a parallel fragment based on a threshold associated with a number of essentially continuous words assigned a positive translation probability.

10. The computer program recited in claim 6 further comprising an instruction for determining whether the source document comprises a parallel translation of the target document.

11. A method for identifying parallel documents in a bilingual collection of documents, the method comprising:

translating a source document from a bilingual collection of documents using a processor configured to perform statistical machine translation;

querying a target library associated with the bilingual collection of documents using the translated source document using a query engine of the processor;

identifying a predetermined limited number one or more target documents in the target library that are most similar to the translated source document, based on the query using the query engine;

aligning one or more source sentence associated with the source document to one or more target sentences associated with each of the one or more identified target documents to generate one or more aligned sentence pairs, the aligning performed using a document selector engine of the processor;

discarding each of the one or more identified target documents that does not have a specified number of sentence pairs that can be aligned, the discarding performed using the document selector engine;

determining for each of the one or more identified target documents a number of aligned sentence pairs that are translations of each other, the determining performed using the document selector engine; and determining whether the source document comprises a parallel translation of one of the one or more target documents, the determining performed using a parallel document engine of the processor and comprising:

determining a percentage of words that are aligned in each sentence pair of the target document using greedily linking, determining a number of sentence pairs in the target document that are parallel sentence pairs based on the percentage of words that are aligned in each sentence pair, and selecting the target document as being a parallel translation of the source document according to a number of parallel sentence pairs in the target document.

12. The method recited in claim 11 wherein determining whether the source document comprises a parallel translation of one of the one or more target documents further comprises determining whether the number of the source sentences aligned to the one or more target sentences satisfies a threshold associated with noisy sentences.

13. The method recited in claim 11 wherein determining whether the source document comprises a parallel translation of the target document further comprises determining whether the number of the source sentences aligned to the one or more target sentences satisfies a threshold associated with monotone sentences.

14. The method recited in claim 11 further comprising determining whether a source fragment associated with the source sentence comprises a parallel translation of a target fragment associated with one of the one or more target sentences.

15. A system for identifying parallel documents in a bilingual collection, the system comprising:

a word translator engine stored in a memory, executable by a processor, and configured to translate a source document from a bilingual collection;

a query engine configured to query a target library associated with the bilingual collection using the translated source document and identify one or more target documents based on the query;

a document selector engine configured to align a source sentence associated with the source document to one or more target sentences associated with the one or more target documents; and a parallel document engine configured to determine whether the source document comprises a parallel translation of one of the one or more the target documents, the parallel document engine further configured to:

determining a percentage of words that are aligned in each sentence pair of the target document using greedily linking, determining a number of sentence pairs in the target document that are parallel sentence pairs based on the percentage of words that are aligned in each sentence pair, and selecting the target document as being a parallel translation of the source document according to a number of parallel sentence pairs in the target document.

16. The system recited in claim 15 wherein the parallel document engine further comprises a sentence analysis module configured to select the one of the one or more target documents according to a number of the source sentences within the source document aligned to the one or more target sentences.

17. The system recited in claim 16 wherein the parallel document engine further comprises a document classification module configured to determine whether the number of the source sentences aligned to the one or more target sentences satisfies a threshold associated with noisy sentences.

18. The system recited in claim 16 wherein the parallel document engine further comprises a document classification module configured to determine whether the number of the source sentences aligned to the one or more target sentences satisfies a threshold associated with monotone sentences.

19. The system recited in claim 15 further comprising a parallel fragment engine configured to determine whether a source fragment associated with the source sentence comprises a parallel translation of a target fragment associated with the one or more target sentences.

* * * * *

UNITED STATES PATENT AND TRADEMARK OFFICE
CERTIFICATE OF CORRECTION

PATENT NO.        : 8,943,080 B2
APPLICATION NO.   : 11/635248
DATED             : January 27, 2015
INVENTOR(S)       : Daniel Marcu et al.

It is certified that error appears in the above-identified patent and that said Letters Patent is hereby corrected as shown below:

In the Claims

Column 10, line 37 cancel the text beginning with "1. A method for identifying parallel sub-sentential fragments" and ending with "the target document." in column 11, line 7, and insert the following claim:

--1. A method for identifying parallel sub-sentential fragments in a bilingual collection of documents, the method comprising:

translating a source document in the bilingual collection of documents using a processor configured to perform statistical machine translation;

querying a target library associated with the bilingual collection of documents using the translated source document using a query engine of the processor;

identifying a plurality of target documents in the target library that are most similar to the translated source document, based on the query, using the query engine;

aligning a source sentence associated with the source document to one or more target sentences associated with each of the plurality of identified target documents to generate one or more aligned sentence pairs, using a document selector engine of the processor;

discarding an aligned sentence pair based on a number of words in the sentence pair that are translations of each other, using the document selector engine; and determining for each of the aligned sentence pairs that have not been discarded whether a source fragment in the source sentence comprises a parallel translation of a target fragment in the target sentence based on a number of words in the source fragment that are translations of words in the target fragment, the determining performed using a parallel document engine of the processor and comprising:

determining a percentage of words that are aligned in each sentence pair of a target document of the plurality of target documents using greedily linking, determining a number of sentence pairs in the target document that are parallel sentence pairs based on the percentage of words that are aligned in each sentence pair, and Signed and Sealed this
Fourteenth Day of July, 2015

Michelle K. Lee
*Director of the United States Patent and Trademark Office*

CERTIFICATE OF CORRECTION (continued)
U.S. Pat. No. 8,943,080 B2 selecting the target document as being a parallel translation of the source document according to a number of parallel sentence pairs in the target document.--

Column 11, line 26 cancel the text beginning with "6. A computer program embodied on a non-transitory computer" and ending with "the target document." in column 11, line 51, and insert the following claim:

--6. A computer program embodied on a non-transitory computer readable medium having instructions for identifying parallel sub-sentential fragments in a bilingual collection, the instructions comprising the steps:
      translating a source document from a bilingual collection;
      querying a target library associated with the bilingual collection using the translated source document;
      identifying one or more target documents based on the query;
      aligning a source sentence associated with the source document to one or more target sentences associated with the one or more target documents; and
      determining whether a source fragment associated with the source sentence comprises a parallel translation of a target fragment associated with the one or more target sentences, the determination comprising:
            determining a percentage of words that are aligned in each sentence pair of a target document of the plurality of target documents using greedily linking,
            determining a number of sentence pairs in the target document that are parallel sentence pairs based on the percentage of words that are aligned in each sentence pair, and
            selecting the target document as being a parallel translation of the source document according to a number of parallel sentence pairs in the target document.--

Column 11, line 66 cancel the text beginning with "11. A method for identifying parallel documents " and ending with "the target document." in column 12, line 40, and insert the following claim:

--11. A method for identifying parallel documents in a bilingual collection of documents, the method comprising:
      translating a source document from a bilingual collection of documents using a processor configured to perform statistical machine translation;
      querying a target library associated with the bilingual collection of documents using the translated source document using a query engine of the processor;
      identifying a predetermined limited number one or more target documents in the target library that are most similar to the translated source document, based on the query using the query engine;
      aligning one or more source sentences associated with the source document to one or more target sentences associated with each of the one or more identified target documents to generate one or more aligned sentence pairs, the aligning performed using a document selector engine of the processor;
      discarding each of the one or more identified target documents that does not have a specified number of sentence pairs that can be aligned, the discarding performed using the document selector engine;

determining for each of the one or more identified target documents a number of aligned sentence pairs that are translations of each other, the determining performed using the document selector engine; and determining whether the source document comprises a parallel translation of one of the one or more target documents, the determining performed using a parallel document engine of the processor and comprising:

determining a percentage of words that are aligned in each sentence pair of a target document of the plurality of target documents using greedily linking, determining a number of sentence pairs in the target document that are parallel sentence pairs based on the percentage of words that are aligned in each sentence pair, and selecting the target document as being a parallel translation of the source document according to a number of parallel sentence pairs in the target document.--

Column 13, line 19 cancel the text beginning with "16. The system recited in claim 15" and ending with "sentences." in column 14, line 4, and insert the following claim:

--16. A system for identifying parallel documents in a bilingual collection, the system comprising:

a word translator engine stored in a memory, executable by a processor, and configured to translate a source document from a bilingual collection;

a query engine configured to query a target library associated with the bilingual collection using the translated source document and identify one or more target documents based on the query;

a document selector engine configured to align a source sentence associated with the source document to one or more target sentences associated with the one or more target documents; and a parallel document engine configured to determine whether the source document comprises a parallel translation of one of the one or more the target documents, the parallel document engine further configured to:

determining a percentage of words that are aligned in each sentence pair of a target document of the plurality of target documents using greedily linking, determining a number of sentence pairs in the target document that are parallel sentence pairs based on the percentage of words that are aligned in each sentence pair, and selecting the target document as being a parallel translation of the source document according to a number of parallel sentence pairs in the target document.--

Column 14, line 5 cancel the text beginning with "17. The system recited in claim 16" and ending with "sentences." in column 14, line 9, and insert the following claim:

--17. The system recited in claim 16 wherein the parallel document engine further comprises a sentence analysis module configured to select one of the one or more target documents according to a number of the source sentences within the source document aligned to the one or more target sentences.--